(12) United States Patent
Ono et al.

(10) Patent No.: US 7,139,853 B2
(45) Date of Patent: Nov. 21, 2006

(54) DATA TRANSMISSION/RECEPTION SYSTEM, CONNECTION ESTABLISHING METHOD AND INFORMATION TRANSMISSION/RECEPTION APPARATUS

(75) Inventors: Kinya Ono, Tokorozawa (JP); Hidemi Usuba, Tokorozawa (JP); Sho Murakoshi, Tokorozawa (JP); Kunihiro Minoshima, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 560 days.

(21) Appl. No.: 10/041,736

(22) Filed: Jan. 10, 2002

(65) Prior Publication Data
US 2002/0095505 A1    Jul. 18, 2002

(30) Foreign Application Priority Data
Jan. 12, 2001    (JP)    ............................ P2001-005648

(51) Int. Cl.
G06F 13/42    (2006.01)
G06F 15/173    (2006.01)
G06F 15/12    (2006.01)

(52) U.S. Cl. .................. 710/105; 709/227; 710/71; 710/313

(58) Field of Classification Search ................ 709/227; 710/71, 313, 105
See application file for complete search history.

(56) References Cited

U.S. PATENT DOCUMENTS 6,249,829 B1 *    6/2001    Bloks et al. ................. 710/113
6,275,889 B1 *    8/2001    Saito .......................... 710/313
6,591,313 B1 *    7/2003    Hata et al. .................... 710/33
6,721,831 B1 *    4/2004    Lee ............................. 710/105
6,721,859 B1 *    4/2004    Smyers ........................ 711/154
6,763,391 B1 *    7/2004    Ludtke ........................ 709/231
6,839,347 B1 *    1/2005    Ishida et al. ................. 370/389
6,928,503 B1 *    8/2005    Mosgrove .................... 710/302

FOREIGN PATENT DOCUMENTS

| EP | 0 862 295 A1 | 9/1998 |
| EP | 0 930 747 A1 | 7/1999 |
| EP | 0 986 216 A2 | 3/2000 |
| EP | 0 994 421 A2 | 4/2000 |

OTHER PUBLICATIONS

Institute of Electrical and Electronics Engineers: "IEEE Standard for a High Performance Serial Bus-1394-1995", No. ISBN 1-55937-583-3, 1995, p. I-VIII, 19-45, 203-241,307, XP002308510.

Kunzman A J et al: "1394 High Performance Serial Bus: the Digital Interface for ATV" IEEE Transactions on Consumer Electronics, IEEE Inc. New York, US, vol. 41, No. 3, Aug. 1995, pp. 893-900, XP000539552.

* cited by examiner

Primary Examiner—Gopal C. Ray
Assistant Examiner—Christopher Daley
(74) Attorney, Agent, or Firm—Sughrue Mion, PLLC

(57) ABSTRACT

At each node of the data transmission/reception system of the present invention on a bus of an IEEE 1394, the following operations are sequentially performed: necessary initialization at the time of bus resetting; and GUID acquisition, restoration of Broadcast-out connection, restoration of Broadcast-in connection, and restoration of Point-to-point connection according to a restoration connection queue registering an execution order of respective connection restoration operations if there is a PENDING status of each connection before a passage of a predetermined time, after the bus resetting. Moreover, the restoration of each connection is subdivided into a plurality of processing steps when necessary, and controlled to select a proper processing step.

17 Claims, 15 Drawing Sheets

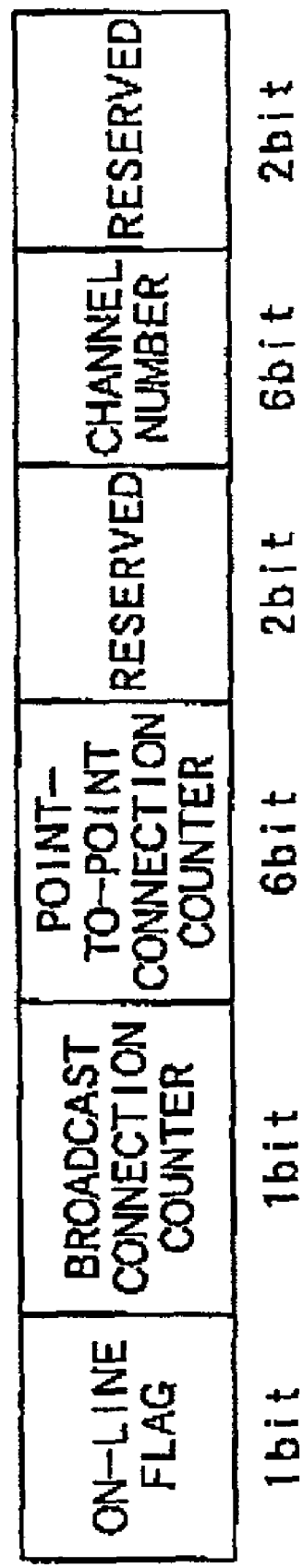

FIG. 5A — oPCR INFORMATION

| STATUS OF BROADCAST-OUT CONNECTION |
|---|
| PROCESS |
| BROADCAST CONNECTION COUNTER |
| OVERHEAD ID |

FIG. 5B — 1PCR INFORMATION

| STATUS OF BROADCAST-IN CONNECTION |
|---|
| BROADCAST CONNECTION COUNTER |

FIG. 5C — POINT-TO-POINT CONNECTION INFORMATION

| STATUS OF POINT-TO-POINT CONNECTION |
|---|
| PROCESS |
| GUID OF TRANSMISSION SIDE NODE |
| PLUG ID OF TRANSMISSION SIDE NODE |
| GUID OF RECEIVING SIDE NODE |
| PLUG ID OF RECEIVING SIDE NODE |
| DATA TRASFER SPEED |
| OVERHEAD ID |
| PAYLOAD |
| CHANNEL NUMBER |

DATA TRANSMISSION/RECEPTION SYSTEM, CONNECTION ESTABLISHING METHOD AND INFORMATION TRANSMISSION/RECEPTION APPARATUS

BACKGODUND OF THE INVENTION

1. Field of the Invention

The present invention relates to a data transmission/reception system having a plurality of information transmitters/receivers connected to nodes on a bus, and adapted to transmit/receive data by establishing a connection between the nodes. More particularly, the present invention is directed to a technical field including a data transmission/reception system, a connection establishing method, and an information transmission/reception apparatus for executing connection establishment between the nodes on a serial bus compliant with Institute of Electrical and Electronic Engineers (IEEE) Std. 1394-1995 IEEE Standard for a High Performance serial Bus (IEEE 1394 Standard).

2. Description of the Related Art

In recent years, the IEEE 1394 Standard has attracted attention as a standard of an interface for transmitting digital data between AV devices or between computer peripheral devices. The IEEE 1394 Standard provides various advantages including capability of transmitting/receiving data at a high transmission/reception speed, a high degree of freedom for a topology connection, suitability for real time data transmission/reception carried out based on isochronous transmission/reception, and the like, and also provides higher usefulness compared with a conventional interface standard.

To perform data transmission/reception by the IEEE 1394 Standard, a connection must be established between plugs provided in respective nodes. To perform isochronous transmission/reception, necessary processing operations are sequentially performed, which includes access to an Isochronous Resource Manager (IRS) for managing isochronous resources, allocating of a channel, a bandwidth and the like, updating of registration of a predetermined plug, and the like. In addition, to support hot plug of a device with power ON, connection restoration is carried out. That is, bus resetting is generated when a topology connection of a bus is changed, and an original connection between the nodes is restored within 1 sec., after an established connection is reset.

However, since a plurality of input plugs, and output plugs can be set in a device connected to each node on the bus of the IEEE 1394, there are also various types of connections, e.g., Broadcast-in connection, Broadcast-out connection, Point-to-point connection, and the like. Consequently, a series of processing operations included in the connection establishment become complicated. A transaction is issued when a channel or a bandwidth is allocated and, in this case, a timeout or a data error may occur. In such a case, if no response is obtained to the transaction, a managing status of isochronous resources to be used for the connection becomes unknown, creating a possibility that the channel or the bandwidth will be partially left unused. Consequently, portions to be allocated among original isochronous resources are substantially reduced, leading to wasteful use of bus resources of the IEEE 1394 during the connection establishment. A similar problem occurs in the case of the connection restoration carried out during the bus resetting.

SUMMARY OF THE INVENTION

The present invention was made with the foregoing problems in mind, and it is an object of the present invention to construct a highly reliable data transmission/reception system, which determines whether bus resources can be managed or not when a connection is established, prevents unmanageable bus resources from being left after the connection is established, and properly allocates the bus resources.

The above object of the present invention can be achieved by a data transmission/reception system of the present invention. The data transmission/reception system is provided with: a plurality of information transmitters/receivers connected to nodes on a bus, for transmitting/receiving data through a connection established between the nodes; a connection establishing device for establishing a connection at each node; a connection status information holding device for holding connection status information indicating a managing status of bus resources while updating it during the execution of the connection establishment at each node; a connection status information referring device for referring to the connection status information; and a processing executing device for executing predetermined processing to avoid unmanageable status of the bus resources when it is determined that the managing status of the bus resources is out of a permissible range.

According to the present invention, when connection establishment is started at each node to perform data transmission/reception between the information transmitters/receivers in the data transmission/reception system, the managing status of the bus resources is held by being updated each time in the connection status information. Thus, determination can be easily made as to a manageable status of the bus resources for normal proceeding of the connection establishment. If a predetermined condition based on the connection status information determines that the managing status of the bus resources is at an impermissible level, this fact is notified to the upper layer such as an application. Thus, processing is carried out: for example, bus resetting is generated to reset the connection on the bus, and connection establishment is executed again. As a result, without maintaining a status where unmanageable bus resources are left, it is possible to prevent wasteful use of the bus resources, and establish a connection by properly allocating the bus resources.

In one aspect of the present invention, a plurality of connection establishments are provided corresponding to types of the connections, and the connection status information holding device holds the connection status information for each connection establishment.

According to this aspect, a different connection type can be used at each node, and connection establishment is executed by using different connection status information. Thus, even if specified connection establishment is unmanageable, it is possible to smoothly proceed with other connection establishments.

In another aspect of the present invention, the processing executing device generates bus resetting if a predetermined number or more of bits of the connection status information set in unknown statuses are present among connections to be established on the bus.

According to this aspect, when the connection establishment is executed, bus resetting is generated if a predetermined number or more of bits of the connection status information corresponding to the connections of the entire bus. Thus, it is possible to prevent wasteful use of the bus resources caused by an increase of unknown connections.

In further aspect of the present invention, the managing status of the bus resources indicated by the connection status information includes, in addition to an unknown status, a valid status, an invalid status, and a status of processing being executed.

According to this aspect, by referring to the connection status information, determination can be made as to which one of the statuses, i.e., unknown, valid, invalid and processing being executed, the managing status of the bus resources is in the connection establishment Thus, it is possible to carefully and meticulously control a content to be processed and an execution order according to a status.

In further aspect of the present invention, the connection establishments include processing for allocating a channel for interconnecting the nodes, and processing for allocating a bandwidth necessary for data transmission/reception, and the connection status information holding device updates the connection status information to an unknown status if a transaction in each processing results in a timeout or a data error. According to this aspect, in the processing for allocating a channel and a bandwidth for connection restoration, the connection status information is set in an unknown status if a transaction in each processing results in a timeout or a data error. Thus, for example, if no normal response is obtained from the other node, it is possible to prevent allocating of a specified channel or bandwidth from being unknown.

In further aspect of the present invention, the bus is a serial bus compliant with IEEE 1394 Standard, and the plurality of connection establishments include establishment of a Broadcast-out connection, establishment of a Broadcast-in connection, and establishment of a Point-to-point connection.

According to this aspect, three connection establishments like those described above are executed by using the general-purpose IEEE 1394 Standard suited for digital data transmission/reception. Thus, it is possible to enhance reliability and processing efficiency of the IEEE 1394 bus system.

In further aspect of the present invention, the plurality of connection establishments includes restoration of the Broadcast-out connection, restoration of the Broadcast-in connection, and restoration of the Point-to-point connection in accordance with connection restoration carried out to restore the connection at each node before a passage of predetermined time after resetting of the connection established following the bus resetting.

According to this aspect, the foregoing three connection establishments are applied to the connection restoration at the time of bus resetting by using the IEEE 1304 Standard. Thus, it is possible to enhance reliability and processing efficiency of the IEEE 1394 bus system, which generates bus resetting for each hot plug of the information transmitter/receiver.

The above object of the present invention can be achieved by a connection establishing method of the present invention for establishing a connection between nodes of a data transmission/reception system in which a plurality of information transmitters connected to the nodes on a bus transmit data. The method is provided with the processes of: holding connection status information indicating a managing status of bus resources while updating it during the execution of the connection establishment at each node; referring to the connection status information; and executing predetermined processing to avoid unmanageable status of the bus resources when it is determined that the managing status of the bus resources is out of a permissible range.

According to the present invention, when connection establishment is started at each node to perform data transmission/reception between the information transmitters in the data transmission/reception system, the managing status of the bus resources is held by being updated each time in the connection status information. Thus, determination can be easily made as to a manageable status of the bus resources for normal proceeding of the connection establishment. If a predetermined condition based on the connection status information determines that the managing status of the bus resources is at an impermissible level, this fact is notified to the upper layer such as an application. Thus, processing is carried out: for example, bus resetting is generated to reset the connection on the bus, and connection establishment is executed again. As a result, without maintaining a status where unmanageable bus resources are left, it is possible to prevent wasteful use of the bus resources, and establish a connection by properly allocating the bus resources.

In one aspect of the present invention, a plurality of connection establishments are provided corresponding to types of the connections, and the connection status information holding process holds the connection status information for each connection establishment.

According to this aspect, a different connection type can be used at each node, and connection establishment is executed by using different connection status information. Thus, even if specified connection establishment is unmanageable, it is possible to smoothly proceed with other connection establishments.

In another aspect of the present invention, the predetermined processing executing process generates bus resetting if a predetermined number or more of bits of the connection status information set in unknown statuses are present among connections to be established on the bus.

According to this aspect, when the connection establishment is executed, bus resetting is generated if a predetermined number or more of bits of the connection status information corresponding to the connections of the entire bus. Thus, it is possible to prevent wasteful use of the bus resources caused by an increase of unknown connections.

In further aspect of the present invention, the managing status of the bus resources indicated by the connection status information includes, in addition to an unknown status, a valid status, an invalid status, and a status of processing being executed.

According to this aspect, by referring to the connection status information, determination can be made as to which one of the statuses, i.e., unknown, valid, invalid and processing being executed, the managing status of the bus resources is in the connection establishment. Thus, it is possible to carefully and meticulously control a content to be processed and an execution order according to a status.

In further aspect of the present invention, the connection establishments include processing for allocating a channel for interconnecting the nodes, and processing for allocating a bandwidth necessary for data transmission/reception, and the connection status information holding process updates the connection status information to an unknown status if a transaction in each processing results in a timeout or a data error.

According to this aspect, in the processing for allocating a channel and a bandwidth for connection restoration, the connection status information is set in an unknown status if a transaction in each processing results in a timeout or a data error. Thus, for example, if no normal response is obtained from the other node, it is possible to prevent allocating of a specified channel or bandwidth from being unknown.

In further aspect of the present invention, the bus is a serial bus compliant with IEEE 1394 Standard, and the plurality of connection establishments include establishment of a Broadcast-out connection, establishment of a Broadcast-in connection, and establishment of a Point-to-point connection.

According to this aspect, three connection establishments like those described above are executed by using the general-purpose IEEE 1394 Standard suited for digital data transmission/reception. Thus, it is possible to enhance reliability and processing efficiency of the IEEE 1394 bus system.

The above object of the present invention can be achieved by an information transmission/reception apparatus of the present invention, which is connected to a node on a bus, and transmits/receives data through a connection established with another node. The apparatus is provided with: a connection establishing device for establishing the connection with another node; a connection status information holding device for holding connection status information indicating a managing status of bus resources while updating it during the execution of the connection establishment; a connection status information referring device for referring to the connection status information; and a processing executing device for executing predetermined processing to avoid unmanageable status of the bus resources when it is determined that the managing status of the bus resources is out of a permissible range.

According to the present invention, when connection establishment is started at each node to perform data transmission/reception between the information transmitters in the data transmission/reception system, the managing status of the bus resources is held by being updated each time in the connection status information. Thus, determination can be easily made as to a manageable status of the bus resources for normal proceeding of the connection establishment. If a predetermined condition based on the connection status information determines that the managing status of the bus resources is at an impermissible level, this fact is notified to the upper layer such as an application. Thus, processing is carried out: for example, bus resetting is generated to reset the connection on the bus, and connection establishment is executed again. As a result, without maintaining a status where unmanageable bus resources are left, it is possible to prevent wasteful use of the bus resources, and establish a connection by properly allocating the bus resources.

In one aspect of the present invention, a plurality of connection establishments are provided corresponding to types of the connections, and the connection status information holding device holds the connection status information for each connection establishment.

According to this aspect, a different connection type can be used at each node, and connection establishment is executed by using different connection status information. Thus, even if specified connection establishment is unmanageable, it is possible to smoothly proceed with other connection establishments.

In another aspect of the present invention, the processing executing device generates bus resetting if a predetermined number or more of bits of the connection status information set in unknown statuses are present among connections to be established on the bus.

According to this aspect, when the connection establishment is executed, bus resetting is generated if a predetermined number or more of bits of the connection status information corresponding to the connections of the entire bus. Thus, it is possible to prevent wasteful use of the bus resources caused by an increase of unknown connections.

In further aspect of the present invention, the managing status of the bus resources indicated by the connection status information includes, in addition to an unknown status, a valid status, an invalid status, and a status of processing being executed.

According to this aspect, by referring to the connection status information, determination can be made as to which one of the statuses, i.e., unknown, valid, invalid and processing being executed, the managing status of the bus resources is in the connection establishment. Thus, it is possible to carefully and meticulously control a content to be processed and an execution order according to a status.

In further aspect of the present invention, the connection establishments include processing for allocating a channel for interconnecting the nodes, and processing for allocating a bandwidth necessary for data transmission/reception, and the connection status information holding device updates the connection status information to an unknown status if a timeout or a data error occurs in each processing.

According to this aspect, in the processing for allocating a channel and a bandwidth for connection restoration, the connection status information is set in an unknown status if a timeout or a data error occurs. Thus, for example, if no normal response is obtained from the other node, it is possible to prevent allocating of a specified channel or bandwidth from being unknown.

In further aspect of the present invention, the bus is a serial bus compliant with IEEE 1394 Standard, and the plurality of connection establishments include establishment of a Broadcast-out connection, establishment of a Broadcast-in connection, and establishment of a Point-to-point connection.

According to this aspect, three connection establishments like those described above are executed by using the general-purpose IEEE 1394 Standard suited for digital data transmission/reception. Thus, it is possible to enhance reliability and processing efficiency of the IEEE 1394 bus system.

In further aspect of the present invention, the plurality of connection establishments includes restoration of the Broadcast-out connection, restoration of the Broadcast-in connection, and restoration of the Point-to-point connection in accordance with connection restoration carried out to restore the connection at each node before a passage of predetermined time after resetting of the connection established following the bus resetting.

According to this aspect, the foregoing three connection establishments are applied to the connection restoration at the time of bus resetting by using the IEEE 1304 Standard. Thus, it is possible to enhance reliability and processing efficiency of the IEEE 1394 bus system, which generates bus resetting for each hot plug of the information transmitter.

BRIEF DESCRIPTION OF THE DRAWINGS

FIG. 4 is a view showing a data format of iPCR;

FIGS. 5A to 5C are views, each showing a structure of a connection information database;

DETAILED DESRIPTION OF THE PREFERRED EMBODIMENTS

Next, description will be made of a preferred embodiment of the present invention with reference to the accompanying drawings. The embodiment is a case of applying the present invention to a data transmission/reception system, which employs an IEEE 1394 as interface standard for data transmission/reception, As an example of connection establishment in the IEEE 1394 data transmission/reception system, a case of applying the present invention to connection restoration at the time of bus resetting will be described.

Figure 1:
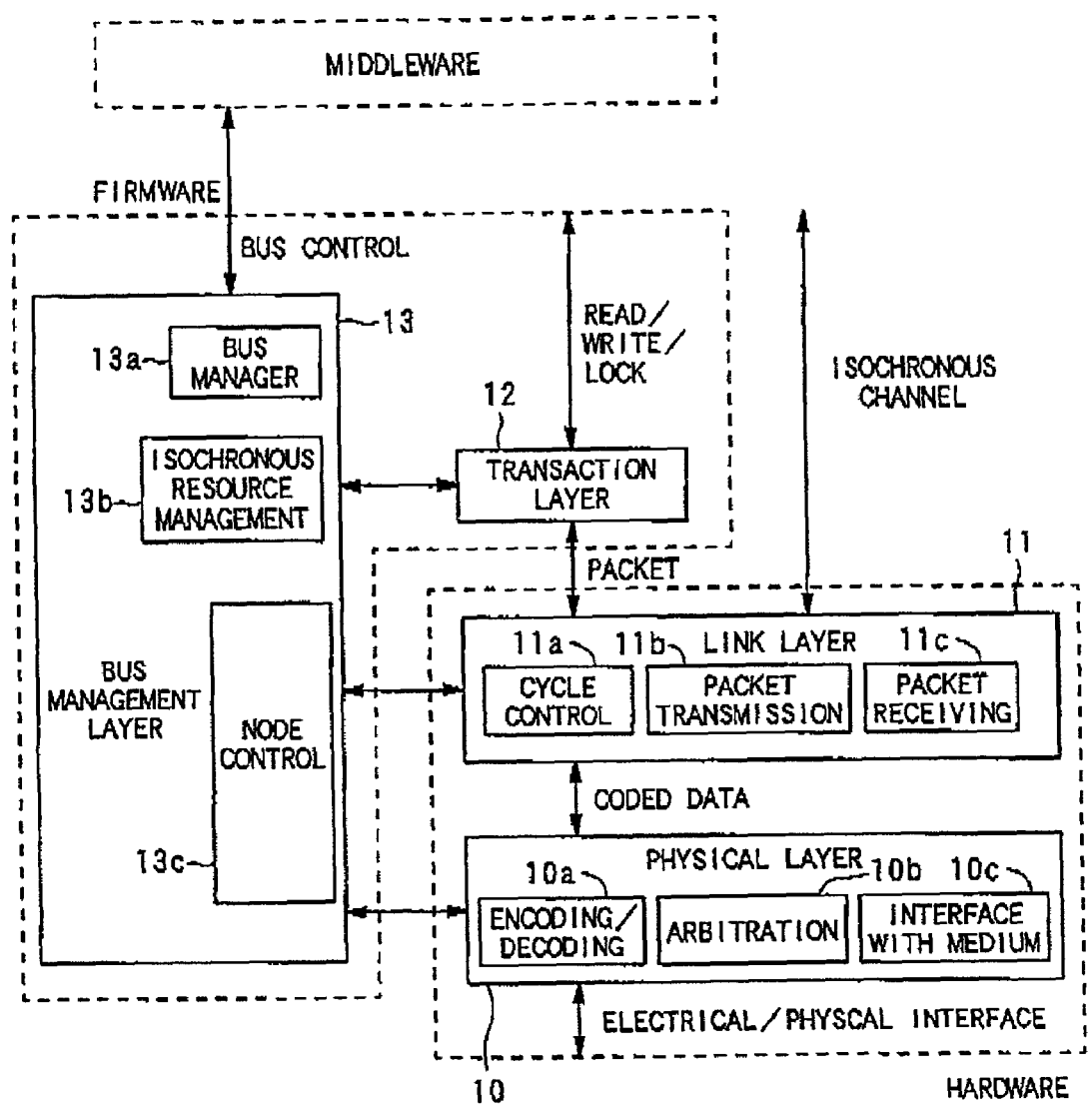
FIG. 1 is a block diagram showing a protocol structure of an IEEE 1394.

FIG. 1 is a block diagram showing a protocol structure of the IEEE 1394. As shown in FIG. 1, a protocol of the IEEE 1394 is comprised of three layers, i.e., a physical layer 10, a link layer 11 and a transaction layer 12, and a bus management layer 13. In general, the physical and link layers 10 and 11 are realized by hardware, while the transaction and bus management layers 12 and 13 are realized by software.

The physical layer 10 interfaces physically and electrically with a bus, and includes an encoding/decoding section 10a for encoding/decoding a signal, a bus arbitration section 10b for arbitrating a right of bus use between nodes, and an interface section 10c for interfacing with a medium on the bus.

The link layer 11 transmits/receives a packet, and includes a cycle control unit 11a for controlling a cycle when transmitting/receiving is carried out, a packet transmission section 11b for transmitting a packet, and a packet receiving section 11c for receiving a packet. In addition, when isochronous transmission/reception is carried out to transmit/receive synchronous data, an isochronous channel is set between the link layer 11 and the bus.

The transaction layer 12 controls communications between an upper application and the link layer 11, and controls an operation of the link layer 11 to execute reading/writing for a node and an address that have been designated. The transaction layer 12 issues a read transaction for reading data of a specified address, a write transaction for writing data in the specified address, and a lock transaction for updating when reference is made to the specified address and a predetermined condition is satisfied.

The bus management layer 13 controls the three layers, i.e., the physical layer 10, link layer and transaction layers 10, 11 and 12, and provides a basic function for node control and bus resource management. The bus management layer 13 includes a bus manager 13a for managing the bus, an isochronous resource management section 13b forming isochronous resources, and a node control unit 13c for controlling a node based on a Command and Status Register (CSR) architecture.

The isochronous resource management section 13b corresponds to at least one IRM being set in a node having an isochronous transmission/reception capability. This IRM includes a register used for isochronous resource management in a CSR space corresponding to a CSR architecture. In the CSR space, as registers necessary for isochronous transmission/reception, a CHANNELS_AVAILABLE register and a BANDWIDTH_AVAILABLE register are provided.

The CHANNELS_AVAILABLE register is a 64-bit register for representing a status of using an isochronous channel, where an amount of data equivalent to 64 channels is held, indicating a status of being currently used if each channel is 1, and a status of being unused if each channel is 0. The BANDWIDTH_AVAILABLE register stores a numerical value indicating a bandwidth to be used for isochronous transmission/reception, where representation is made by setting time necessary for data transmission/reception of 32 bits at a transmission/reception speed of 1600 Mbps as one unit (about 20 nsec.), and the numerical value is indicated based on this unit.

When each node on the bus of the IEEE 1394 carries out isochronous transmission/reception, it is necessary to allocate a channel and a bandwidth, which are proper. Accordingly, by issuing a lock transaction, the CHANNELS_AVAILABLE register and the BANDWIDTH_AVAILABLE register are updated, making its possible to allocate a channel and a bandwidth. In this case, register updating is successfully carried out if the channel and the bandwidth are normally allocated. However, if the channel or the bandwidth cannot be allocated, then register updating by the lock transaction fails.

Figure 2:
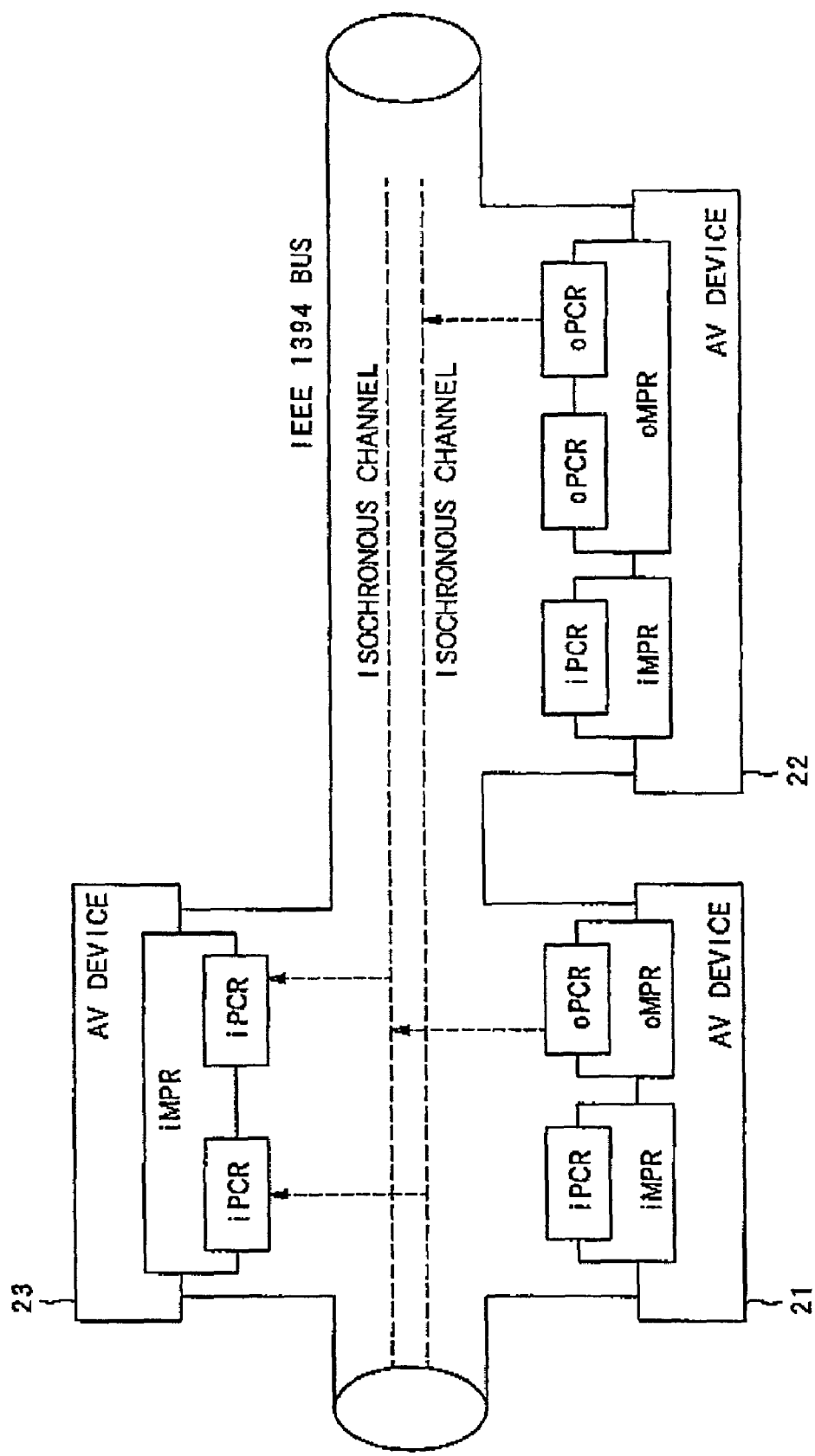
FIG. 2 is a view showing a concept of a data transmission/reception system, which comprises a plurality of information transmitters connected on a bus of the IEEE 1394.

FIG. 2 is a view showing a concept of a data transmission/reception system, which enables a plurality of information transmitters connected on the bus of the IEEE 1394 to transmit data to each other. In the IEEE 1394, in place of a conventional physical signal connection between the information transmitters, a concept of a plug for performing a logical signal connection is employed. Thus, to transmit/receive data on the bus of the IEEE 1394, control is performed via a virtual plug of each information transmitter.

FIG. 2 shows an example where three information transmitters, i.e., AV devices 21, 22 and 23, are connected on the IEEE 1394. Each of the AV devices 21 to 23 includes virtual output and input plugs respectively used for data outputting and inputting. Data transmission/reception can be carried out by sending isochronous data onto the bus through an output plug of a specified AV device, and receiving the isochronous data through an input plug of the other AV device.

As shown in FIG. 2, each of the AV devices 21 and 22 includes an output plug register (oPCR) for controlling an attribute of the output plug, and an output master plug register (oMPR) for controlling an attribute common to the oPCR of the AV device. Each of the AV devices 21 and 23 includes an input plug control register (iPCR) for controlling an attribute of the input plug, and an input master plug register (iMPR) for controlling an attribute common to the iPCR of the AV device.

Since a maximum number of plugs to be set in one AV device is 31, oPCR and iPCR can be provided from 0 up to 31 in number in one AV device. On the other hand, even if many oPCR and iPCR are present in one AV device, the numbers of oMPR and iMPR present are respectively 1. In the example of FIG. 2, the AV device 21 includes iMPR, oPCR, oMPR and oPCR one each. The AV device 22 includes iMPR, iPCR and oMPR one each, and two oPCRs. The AV device 23 includes one iMPR and two iPCRs. It can also be seen that two isochronous channel systems are established for interconnecting the plugs of the AV devices 21 to 23.

Figure 3:
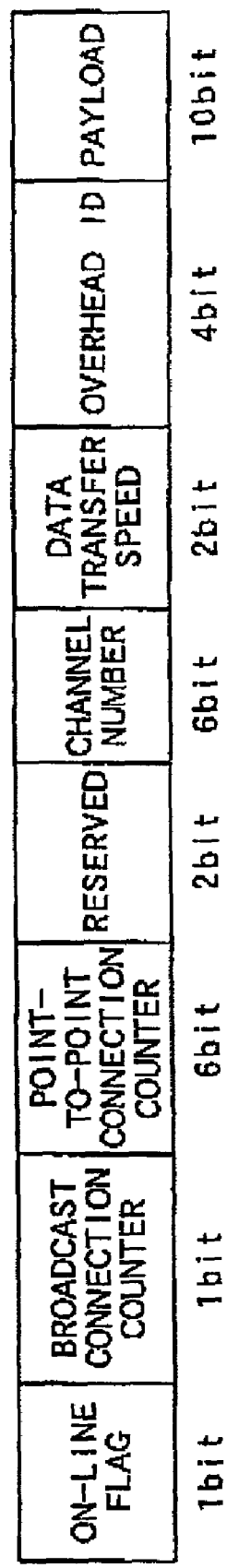
FIG. 3 is a view showing a data format of oPCR.

Now, description will be made of data formats of the oPCR and the iPCR by referring to FIGS. 3 and 4. As shown in FIG. 3, the data format of the oPCR includes an on-line flag for indicating an ON/OFF connection of the output plug, a broadcast connection counter for indicating the number of later-described broadcast connections through the output plug, a Point-to-point connection counter for indicating the number of later-described Point-to-point connections through the output plug, a spare region for future function expansion, a channel number used for isochronous data transmission/reception, a data transmission/reception speed for data transmission/reception, an overhead ID for indicating an amount of overhead added to isochronous data, and a payload for indicating an amount of data transmitted/received at each cycle.

As shown in FIG. 4, the data format of the iPCR includes an on-line flag for indicating an ON/OFF connection of the input plug, a broadcast connection counter for indicating the number of later-described broadcast connections through the input plug, a Point-to-point connection counter for indicating the number of later-described Point-to-point connections through the input plug, two spare regions for future function expansion, and a channel number used for isochronous data transmission/reception.

Regarding a change of a data content of the oPCR or the iPCR, the oPCR or the iPCR to be changed can be changed by its owner itself, i.e., the AV device. Alternatively, the other AV device can change it by issuing a lock transaction through the bus of the IEEE 1394. When such a lock transaction is used, processing is carried out based on an order of transmitting/receiving data from a request side to a response side, processing the data by a specified address at the response side, and retuning the processed data to the request side.

On the other hand, as described above, transmission/reception of isochronous data between the AV devices is, as shown in FIG. 2, carried out through an isochronous channel set on the bus of the IEEE 1394. This isochronous channel functions as a path for interconnecting the input and output plugs of the respective AV devices. Proper setting of the above-described PCR enables a desired isochronous channel to be set. Regarding a form of connection of each AV device to the isochronous channel, there are two forms, i.e., a Point-to-point connection and a broadcast connection.

The Point-to-point connection connects one output plug (oPCR) of a specified AV device, and one input plug (iPCR) of the other AV device to one isochronous channel. With respect to a Point-to-point connection already present in one plug, another Point-to-point connection can be provided.

For the broadcast connection, there are two forms, i.e., a Broadcast-out connection for connecting one output plug (oPCR) of a specified AV device to one isochronous channel, and a Broadcast-in connection for connecting one input plug (iPCR) of a specified AV device to one isochronous channel.

Next, description will be made of processing when bus resetting occurs in the data transmission/reception system on the bus of the IEEE 1394 in the embodiment. In the data transmission/reception system, when a situation such as connection of a new node to the bus, or separation of a connected bus from the bus arises, a bus resetting signal is transmitted to all the nodes on the bus, topology information is all cleared, and initialization is executed to construct new topology according to a change in situation.

When bus resetting occurs, isochronous resources and plugs acquired at the connection establishment of each node are all reset to reset connection. However, the transmission/reception isochronous data is continued for 1 sec., after a bus resetting timing. Thus, at each node, it is necessary to allocate isochronous resources, update each plug corresponding to new topology information within 1 sec., after bus resetting, and perform processing to restore the connection. A connection restoration process on the bus of the IEEE 1394 is comprised of a number of steps. In practice, allocating of isochronous resources or register updating by a transaction may fail, and thus some connections may be left unrestored within 1 sec. According to the embodiment, it is possible to limit unrestorable connections to a minimum at the time of bus resetting by later-described reasonable procedures.

Next, description will be made of a connection restoration process at the time of bus resetting according to the embodiment by referring to FIGS. 5A to 15. In the embodiment, a connection information database for each plug is constructed by memory means on the bus of the IEEE 1394, and various data necessary for me connection restoration process at the time of bus resetting are held. Each of FIGS. 5A to 5C shows a structure of such a connection information database. The connection information database shown in each of FIGS. 5A to 5C function as connecting information recording means of the embodiment, and includes oPCR information corresponding to each output plug, iPCR information corresponding to each input plug, and Pont-to-point connection information corresponding to each connection.

FIG. 5A shows oPCR information, which contains a status of a Broadcast-out connection, processing to be executed in connection restoration of the Broadcast-out connection, and a broadcast connection counter and an overhead ID (FIG. 3) in an oPCR. FIG. 5B shows iPCR information, which contains a status of a Broadcast-in connection, and a broadcast connection counter (FIG. 4) in an iPCR. FIG. 5C shows Point-to-point connection information, which contains a status of a Point-to-point connection, processing to be executed in connection restoration of the Point-to-point connection, a GUID and a plug ID of a transmission side node, a GUID and a plug ID of a receiving side node, a data transmission/reception speed in the oPCR, an overhead ID, a payload, and a channel number (FIG. 3).

Each status included in the connection information database is changed according to a status of isochronous resources regarding each connection restoration, and takes four values, i.e., VALID when a status is valid, INVALID when a status is invalid, UNKNOWN when a status is unknown, and PENDING when connection restoration is being executed. Such a status provides connection status information indicating a managing status of bus resources when a connection is established. Immediately after bus resetting, if a valid connection is present, each status is set to PENDING.

The processing contained in each of the oPCR information and the Point-to-point connection information is a parameter for holding latest processing operations to be executed among those which are executed in a divided manner by subdividing each connection restoration. In addition, the GUID contained in the Point-to-point connection information is an ID intrinsic to each AV device. It is a parameter for specifying an AV device connected on the bus of the IEEE 1394, and described in a configuration ROM defined by a CSR architecture. Acquisition of the GUID during connection restoration at the time of bus resetting enables a correlation with the node ID to be clarified. Specific processing will be described later.

Figure 6:
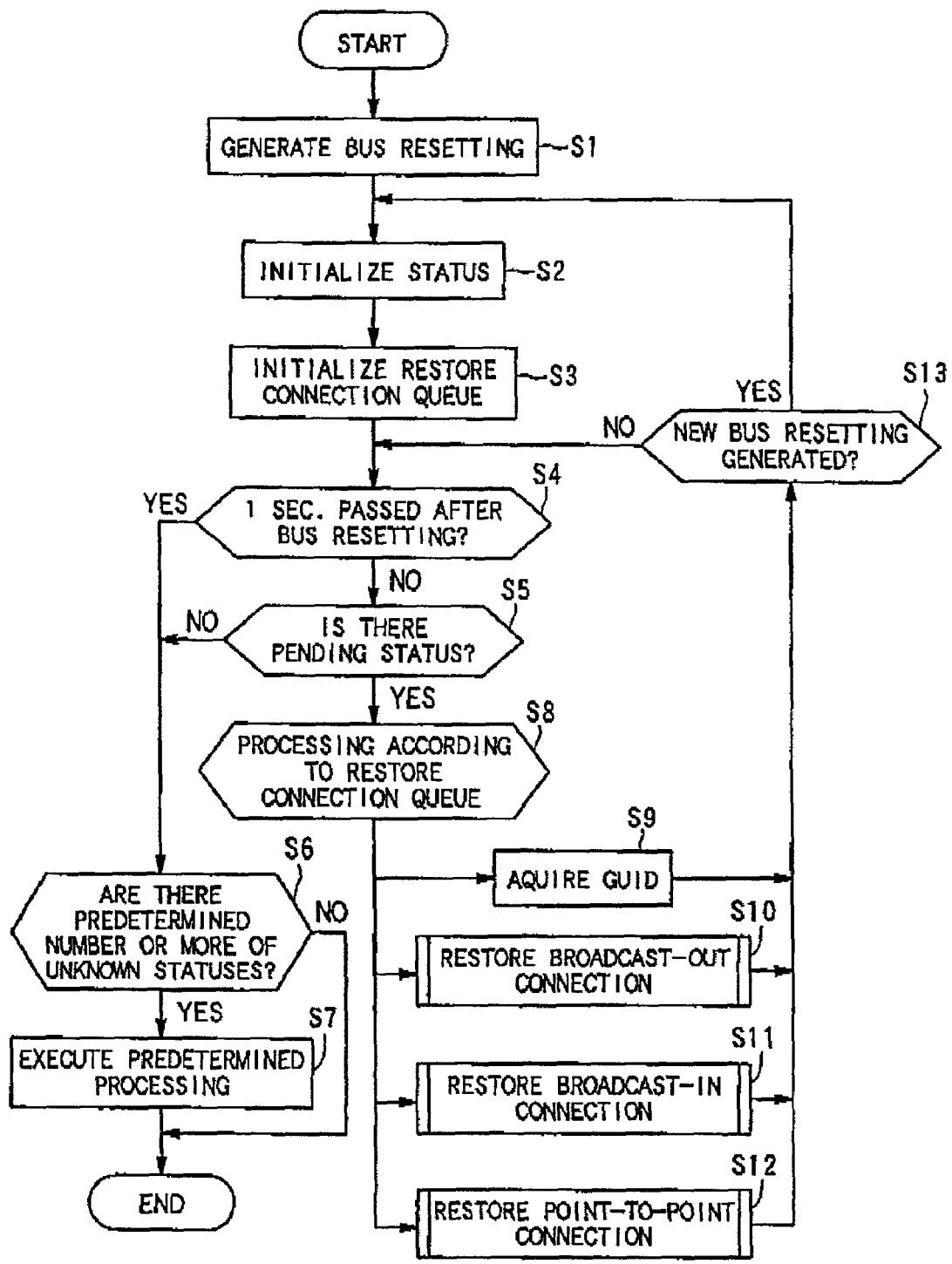
FIG. 6 is a flowchart schematically showing a connection restoration process according to an embodiment.

FIG. 6 is a flowchart schematically showing a connection restoration process performed at a specified node at the time of bus resetting. The process of this flowchart is performed at a layer located in the upper side of firmware of FIG. 1. A request of connection establishment or the like from an application is processed, and transmitted to lower firmware. In other words, it is middleware located between the application and the lower firmware.

As shown in FIG. 6, bus resetting occurs at a predetermined timing because of a change in a node connection on the bus of the IEEE 1394 (step S1). Then, prior to the execution of the connection restoration process at the time of bus resetting, each status of the connection information database of a target node is initialized (step S2). In this case, PENDING is set when a status is VALID; INVALID when a status is UNKNOWN; and its value is held when a status is INVALID or PENDING.

Subsequently, a restoration connection queue for registering an execution order of connection restoration operations is initialized (step S3). This restoration connection queue is comprised of an FIFO realized by firmware or the like of each node on the bus of the IEEE 1394, sequentially registers operations included in the connection restoration process, and functions as registration means for controlling the execution order thereof. That is, in the embodiment, the connection restoration process to be performed for the target node is largely divided into four operations, i.e., restoration of a Broadcast-out connection, restoration of a Broadcast-in connection, restoration of a Point-to-point connection, and GUID acquisition. Thus, control is performed such that these four operations are coded, registered in the restoration connection queue when necessary, and sequentially executed in a registered order. During initialization of step S3, the GUID acquisition, the restoration of a Broadcast-out connection, the restoration of a Broadcast-in connection, and the restoration of a Point-to-point connection are registered in the restoration connection queue in this order and, first, each restoration is executed in this order.

Then, a passage of time from the point of bus resetting is monitored, and determination is made as to a passage of 1 sec. (step S4). If a result of the determination shows non-passage of 1 sec. from the point of bus resetting (step S4; NO), then determination is made as to setting of any one of statuses of the connection database to PENDING (step S5).

If a result of the determination in step S4 shows a passage of 1 sec. from the time of bus resetting (step S4; YES), or a result of the determination in step S5 shows non-presence of a PENDING status (step S5; NO), then determination is made as to presence of a predetermined number or more of UNKNOWN statuses in all the statuses (step S6). If a result of the determination shows presence of a predetermined number or more of UNKNOWN statuses (step S6; YES), then predetermined processing is executed (step S7) to terminate the process of FIG. 6.

For example, the middleware executing the process of FIG. 6 notifies the application of an abnormality of the managing status of the bus resources and a failure of connection establishment. Upon having received the notification, the application can generate bus resetting in the middleware, and request connection establishment, The middleware may notify the application of a failure of connection establishment after generating bus resetting itself and resetting the connection. Alternatively, the middleware may generate bus resetting itself to reset the connection, restore the connection after the bus resetting, and then establish a requested connection again.

As a result, if there are many unknown statuses in each connection restoration, and it is determined that the connection cannot be normally restored, the process of FIG. 6 can be executed again by generating bus resetting in order to carry out connection restoration all over again. On the other hand, if a predetermined number of UNKNOWN statuses is not reached (step S6; NO), the process of FIG. 6 is terminated without executing step S7, and data transmission/reception can be carried out by a restored connection.

On the other hand, if a result of the determination in step S5 shows presence of a PENDING status (step S5; YES), reference is made to the restoration connection queue, and processing is executed according to its content (step S8). As described above, based on the execution order registered in the restoration connection queue, any of acquisition of a GUID (step S9), restoration of a Broadcast-out connection (step S10), restoration of a Broadcast-in connection (step S11), and restoration of a Point-to-point connection (step S12) are sequentially executed. Hereinafter, these four operations are described.

First, in the acquisition of a GUID (step S9), a GUID is acquired by reading information from the configuration ROM provided in the AV device of a target node. When GUID are acquired for all the nodes, step S9 is terminated. On the other hand, if there is a node remaining, for which QUID cannot be acquired for one reason or another, acquisition of GUID is registered in the restoration connection queue in order to acquire GUID next time.

Figure 7:
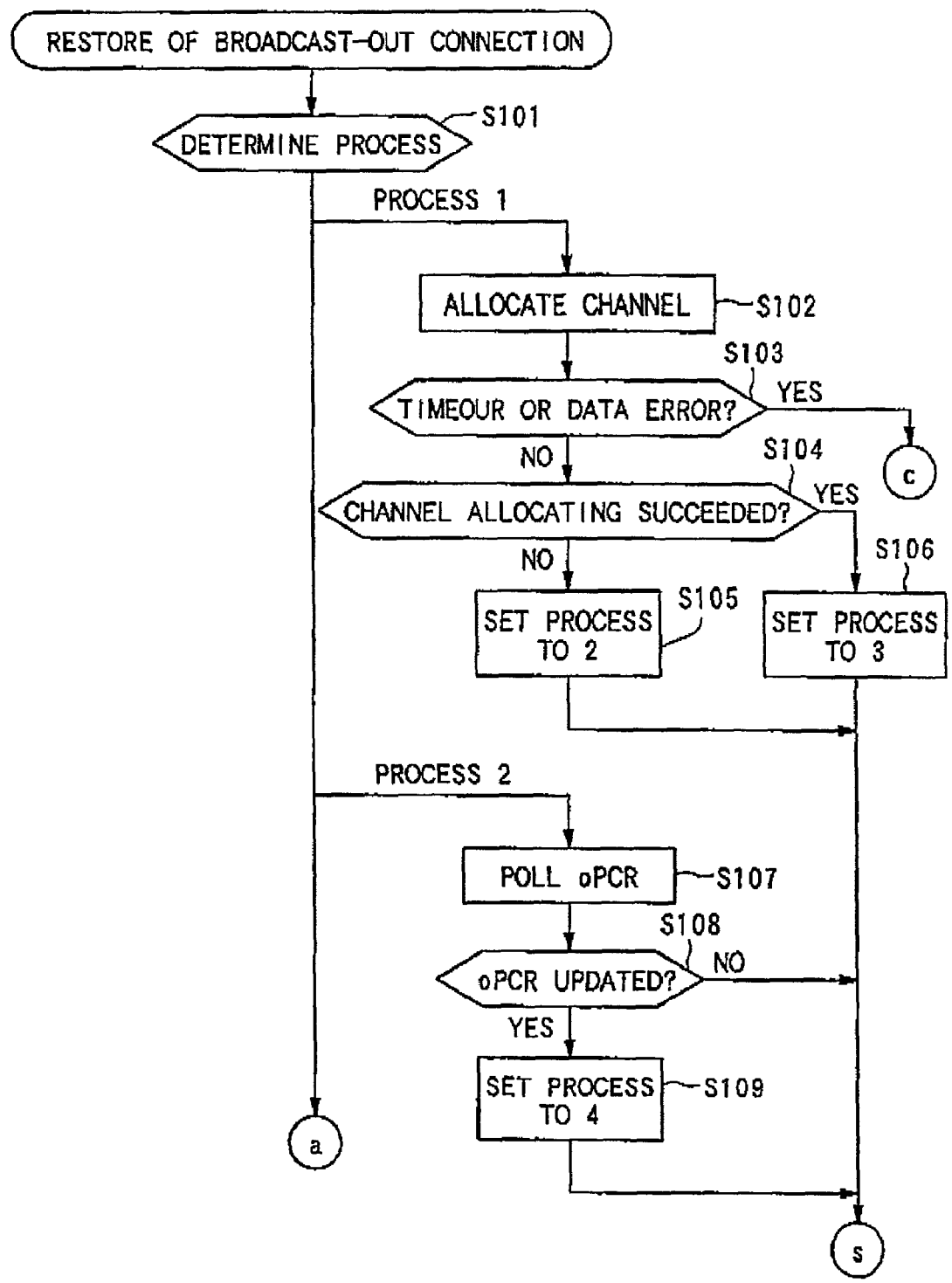
FIG. 7 is a first flowchart showing a restoration process of a Broadcast-out connection.

Next, description will be made of the restoration of a Broadcast-out connection of step S10 by referring to flowcharts of FIGS. 7 to 10. As shown in FIG. 7, when the restoration of a Broadcast-out connection is started according to the restoration connection queue, access is made to oPCR information of a connection information database, and individual processing discriminated by the above described processing is executed (step S101). The restoration of the Broadcast-out connection is divided into totally six individual processes. It is assumed that an initial value of each process is set to 1.

When the process 1 is executed based on determination of step S101, a channel is allocated for a target node (step S102). That is, access is made to a CHANNELS_AVAILABLE register of a CSR space, and a channel is allocated by performing updating corresponding to a desired channel. Then, determination is made as to an occurrence of a timeout or a data error in the processing of step S102 (step S103). If a result of the determination in step S103 shows "YES", since a channel cannot be allocated, the process proceeds to step S121 (FIG. 10) without executing processing thereafter. In the embodiment, a passage of time for determining a timeout is set to 800 cycles (=100 msec.) with 1 cycle=125 µsec.

Figure 10:
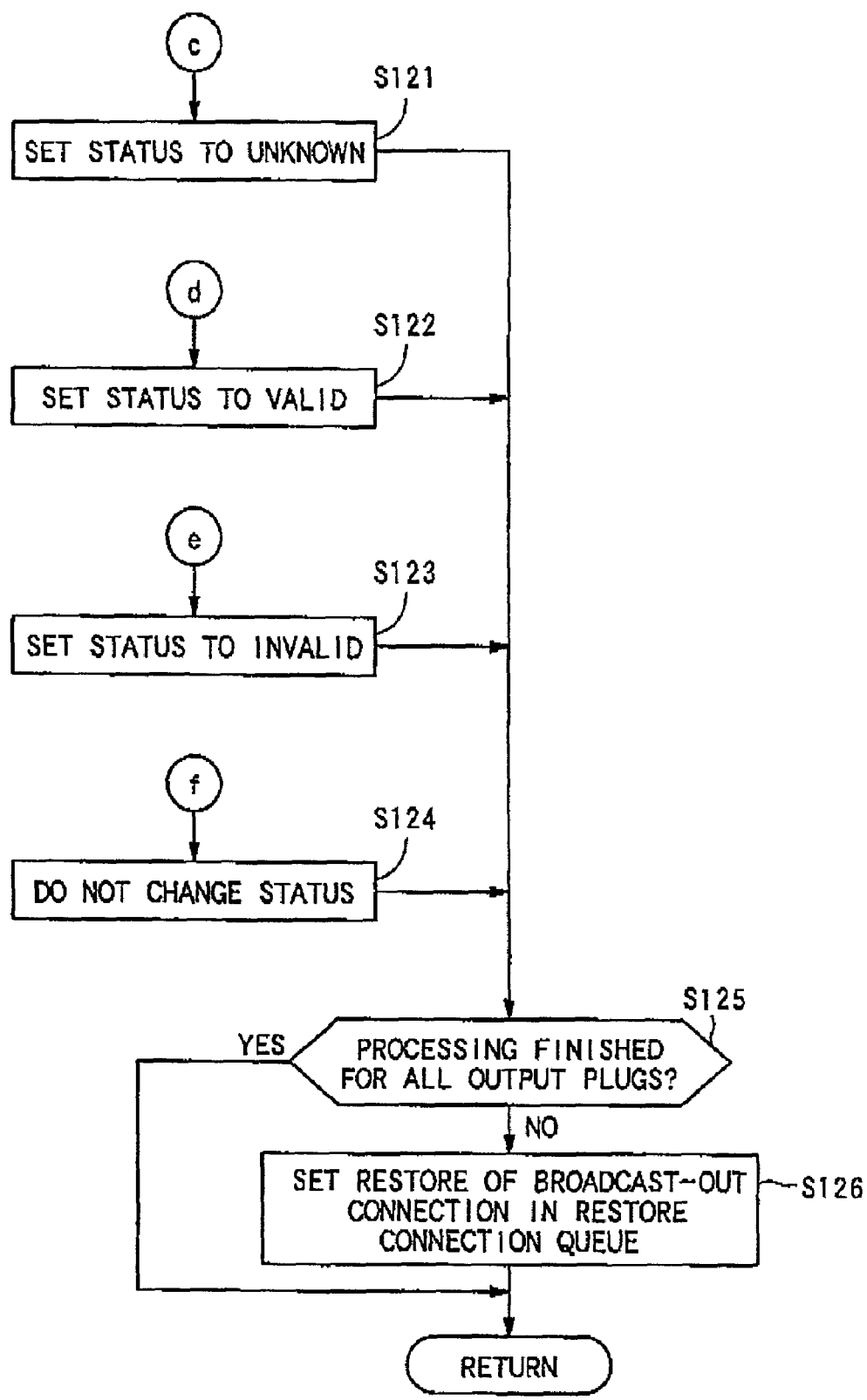
FIG. 10 is a fourth flowchart showing the restoration process of the Broadcast-out connection.

If a result of the determination in step S103 shows "NO", determination is made as to success of allocating a channel (step S104). For example, if a desired channel has already been used by another node, then this channel cannot be allocated. If channel allocating fails (step S104; NO), the process is set to 2 (step S105). If channel allocating succeeds (step S104; YES), the process is set to 3 (step S106). After step S105 or step S106 is finished, the process proceeds to step S124 (FIG. 10).

Subsequently, when the process 2 is executed based on determination of step S101, oPCR polling is executed for an output plug to be connected (step S107). This processing is based on consideration given to a possibility of overlaying with respect to a channel to be used even if channel allocating fails in the process 1. The overlaying means that if a source node and the oPCR are identical, another connection is overlaid on a connection already present on the oPCR, or a Broadcast-out connection or another Point-to-point connection are overlaid on the Point-to-point connection. In step S107, assuming that overlaying is carried out by another node, oPCR polling is executed in order to monitor updating of the Point-to-point connection counter of the oPCR of each output plug after bus resetting.

Subsequently, determination is made as to whether the oPCR polled in step S107 has been updated or not (step S108). For example, a value of the Point-to-point connection is originally 0, the value is changed to 1. If a result of the determination in step 3108 shows "NO", the process proceeds to step S124 (FIG. 10). On the other hand, if a result of the determination in step 8108 shows "YES", the process is set to 4 (step S109). After step S109 is finished, the process proceeds to step S124 (FIG. 10).

Figure 8:
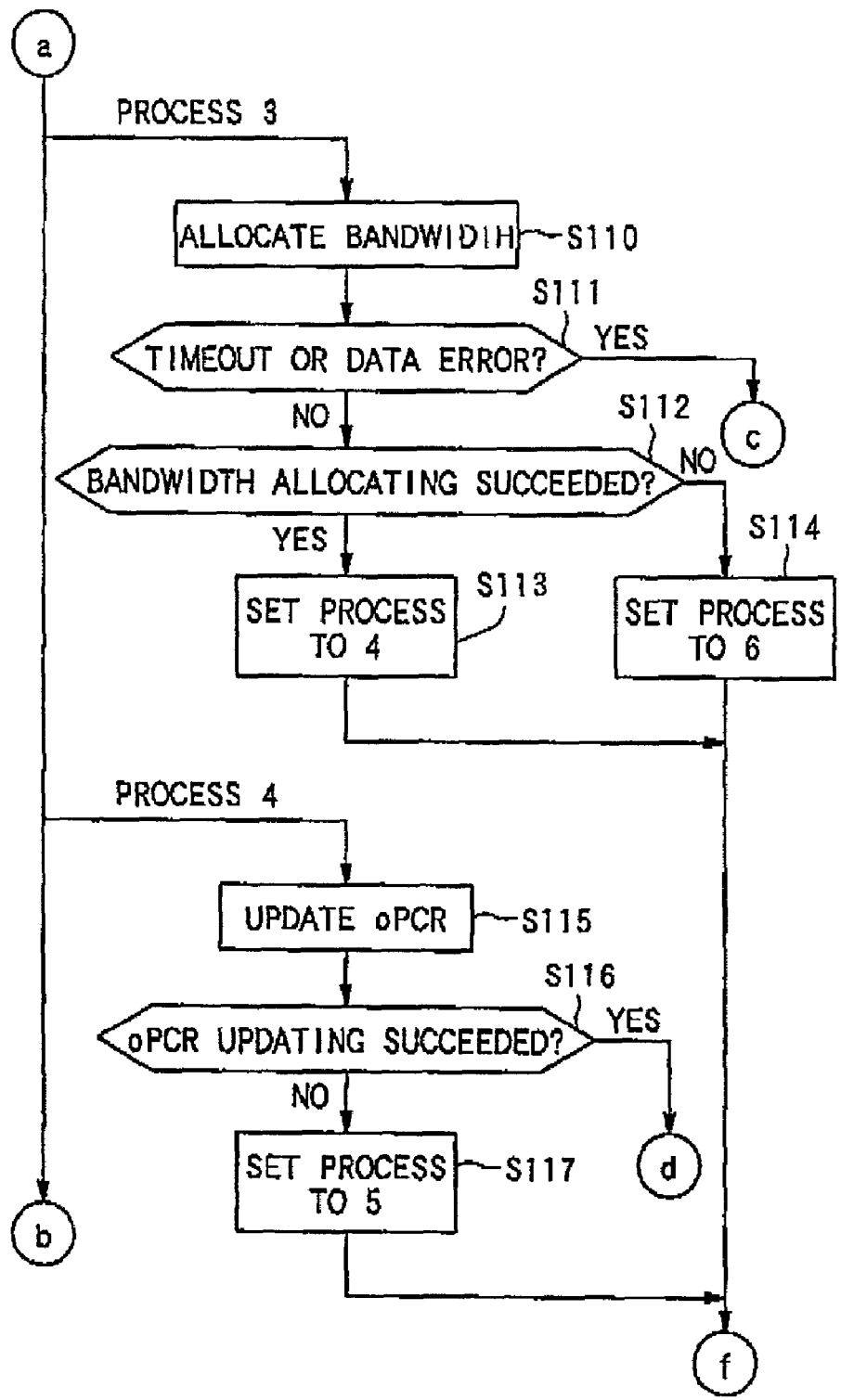
FIG. 8 is a second flowchart showing the restoration process of the Broadcast-out connection.

Then, as shown in FIG. 8, when the process 3 is executed based on determination of step S101, a bandwidth is allocated for a target node (step S110). That is, access is made to a BANDWIDTH_AVALABLE register of a CSR space, and a bandwidth is allocated by performing updating corresponding to a bandwidth necessary for transmission/reception. Subsequently, determination is made as to an occurrence of a timeout (passage of time of 800 cycles (=100 msec.)) or a data error in the processing of step S10 (step S111). If a result of the determination in step S111 shows "YES", since a bandwidth cannot be allocated, the process proceeds to step S121 (FIG. 10) without executing processing thereafter.

On the other hand, if a result of the determination of step S111 shows "NO", then determination is made as to success of allocating of a necessary bandwidth (sep S112). For example, if an available bandwidth is short of a necessary bandwidth, this bandwidth cannot be allocated. If bandwidth allocating succeeds (step S112: YES), the process is set to 4 (step S113). If bandwidth allocating fails (step S112: NO), the process is set to 6 (step S114). After step S113 or step S114 is finished, the process proceeds to step S124 (FIG. 10).

Then, when the process 4 is executed based on determination of step S101, the oPCR is updated for an output plug of a target node (step S115). That is, values corresponding to the channel and the bandwidth allocated in the processes 1 and 3 are set for a channel number and a data transmission/reception speed of the oPCR, and the broadcast connection counter is incremented. Then, based on a result of step S115, determination is made as to success of updating the oPCR (step S116). If a result of the determination shows "YES", the process proceeds to step S122 (FIG. 10). If a result of the determination shows "NO", then the process 5 is set to 5 (step S117). After step S117 is finished, the process proceeds to step S124 (FIG. 10).

Figure 9:
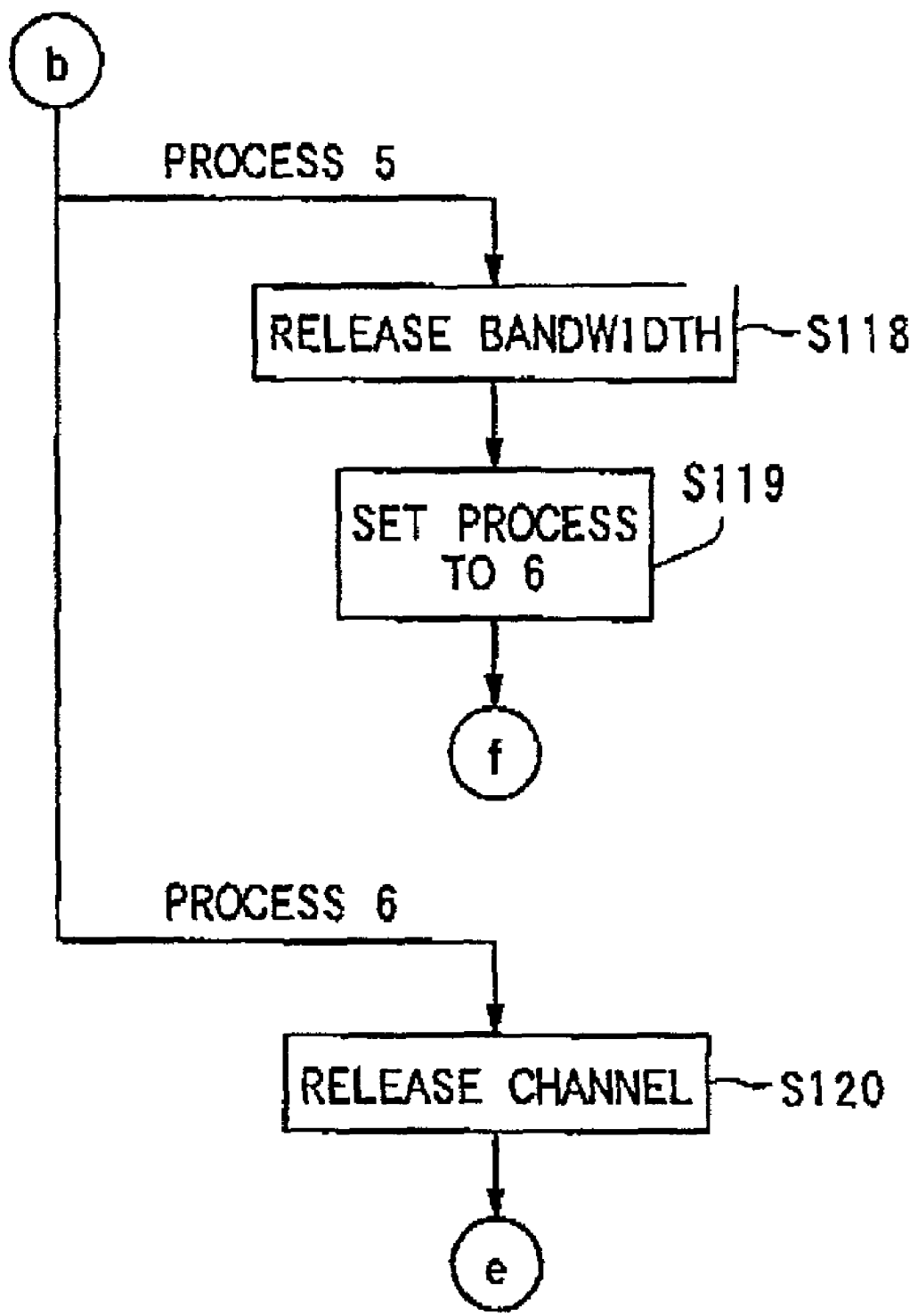
FIG. 9 is a third flowchart showing the restoration process of the Broadcast-out connection.

Subsequently, as shown in FIG. 9, when the process 5 is executed based on determination of step S101, the bandwidth allocated in step S112 is reset (step S118). That is, since the updating of the oPCR fails in the process 4, it is determined that a desired Broadcast-out connection cannot be restored at this point of time, and processing of step S118 is executed to reset the allocated bandwidth. Then, the process is set to 6 (step S119), and the process proceeds to step S124 (FIG. 10).

When the process 6 is executed based on determination of step S101, the channel allocated in step S102 is reset (step S120). That is, for a reason similar to that for the above-described process, processing of step S120 is executed to reset the allocated channel. Following the process 6, the process proceeds to step S123 (FIG. 10).

Next, description will be made of operations following the processes 1 to 6 in the restoration of a Broadcast-out connection by referring to FIG. 10. Steps S121 to S124 in FIG. 10 represent processing for a target status in the connection information database.

First, if processing is a sequel to step S103 (FIG. 7) of the process 1 or step Sill (FIG. 8) of the process 3, a status is set to UNKNOWN (step S121). In this case, since the occurrence of a timeout or a data error was determined, a possibility of normal restoration of a connection to be processed is unknown at this point of time.

If processing is a sequel to step S116 (FIG. 8) of the process 4, a status is set to VALID (step S122). In this case, since allocating of the channel and the bandwidth and the updating of the oPCR succeeded, a connection to be processed is restored and valid at this point of time.

If processing is a sequel to step S120 (RIG. 9) of the process 6, a status is set to INVALID (step S123). In this case, since the channel and the bandwidth were reset for the above-described reasons, a connection to be processed cannot be restored and thus invalid at this point of time.

If processing proceeds to each of the processes 1 to 6 after setting of a process to be executed next, or processing is a sequel to step S108 (FIG. 7) of the process 2, an original value is maintained without changing a status (step S124). In this case, restoration of a target connection must be continued, and a status only needs to be updated when processing further progresses, Following steps S121 to S124, determination is made as to end of the restoration of the broadcast-out connection for all the output plugs of a target node (step S125). If a result shows that there is an unfinished output plug (step S125; NO), restoration of the Broadcast-out connection is registered in the restoration connection queue (step S126), and processing of FIG. 10 is terminated. Thus, for restoration of a remaining Broadcast-out connection, the operations of FIGS. 7 to 10 are executed again in the order registered in the restoration connection queue later. On the other hand, if a result of the determination shows end of the above-described processing for all the output plugs (step S125; YES), or after step S126 is finished, processing of FIG. 11 is finished, and the process proceeds to step S13 (FIG. 6).

Next, description will be made of restoration of a Broadcast-in connection of step S11 by referring to a flowchart of FIG. 11. Here, it is assumed that processing is carried out regarding an iPCR for an input plug and, regarding channel and bandwidth allocating for a Broadcast connection through an output plug, processing is carried out in the foregoing restoration of the Broadcast-out connection. Thus, it is not necessary to divide restoration of a Broadcast-in connection into a plurality of processes unlike the restoration of the Broadcast-out connection.

Figure 11:
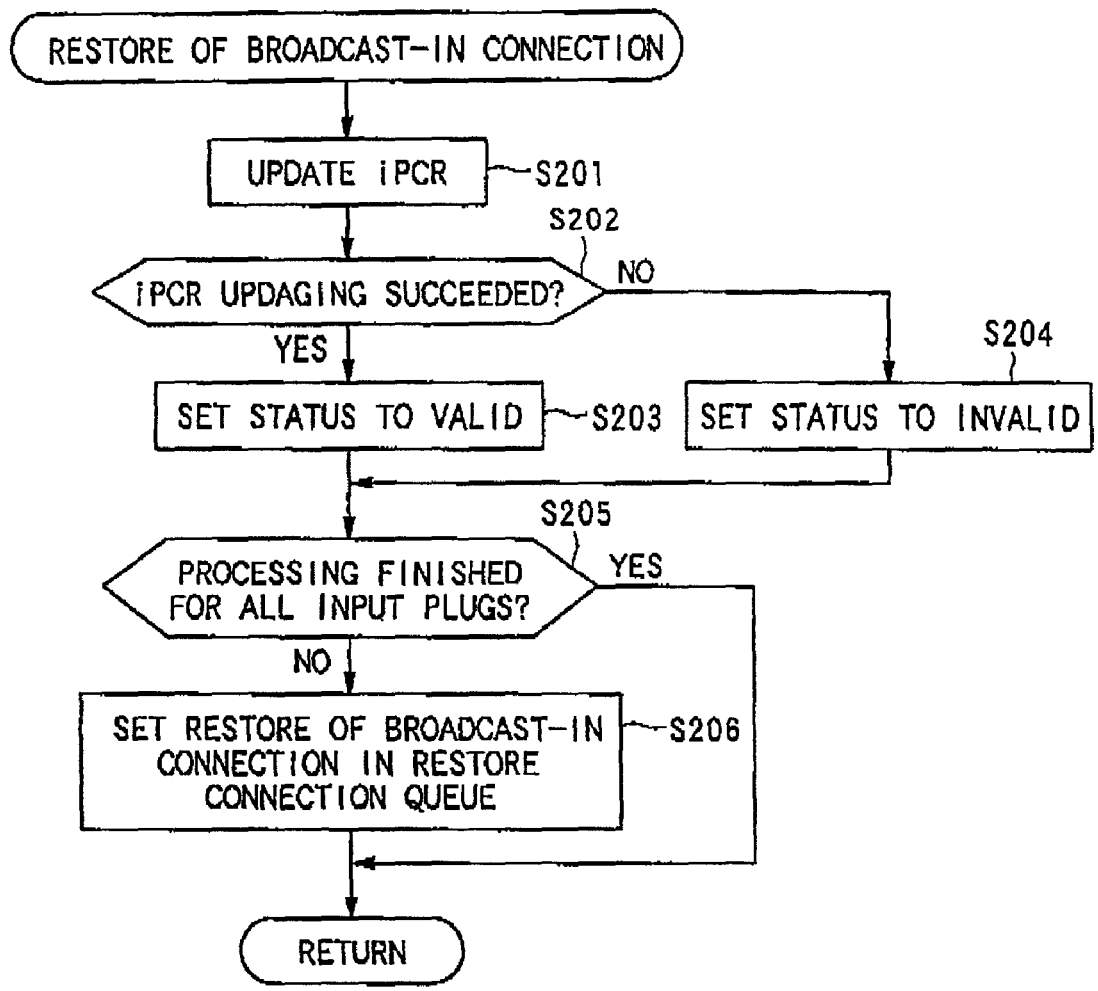
FIG. 11 is a flowchart showing a restoration process of a Broadcast-in connection.

In FIG. 11, when restoration of a Broadcast-in connection is started based on the restoration connection queue, an iPCR is updated with respect to an input plug of a target node (step S201). That is, a channel number for receiving is set, and the broadcast connection counter is incremented.

Then, based on a result of step S201, determination is made as to success of the updating of the iPCR (step S202).

If a result of the determination in step S202 shows "YES", and the updating of the iPCR succeeds, a target status of the connection information database is set to VALID (step S203). On the other hand, if a result of the determination in step S202 shows "NO", and the updating of the iPCR fails, the status is set to INVALID (step S204). Then, determination is made as to end of restoration of the Broadcast-in connection for all the input plugs of a target node (step S205). If a result shows that there is an unfinished input plug (step S205; NO), restoration of the Broadcast-in connection is registered in the restoration connection queue (step S206), and processing of FIG. 11 is terminated. On the other hand, if a result of the determination shows the end of the above-processing for all the input plugs (step S205; YES), the processing of FIG. 11 is terminated without executing step S206. Thus, for restoration of a remaining Broadcast-in connection, the processing of FIG. 1 is executed again based on the order registered in the restoration connection queue later.

Figure 12:
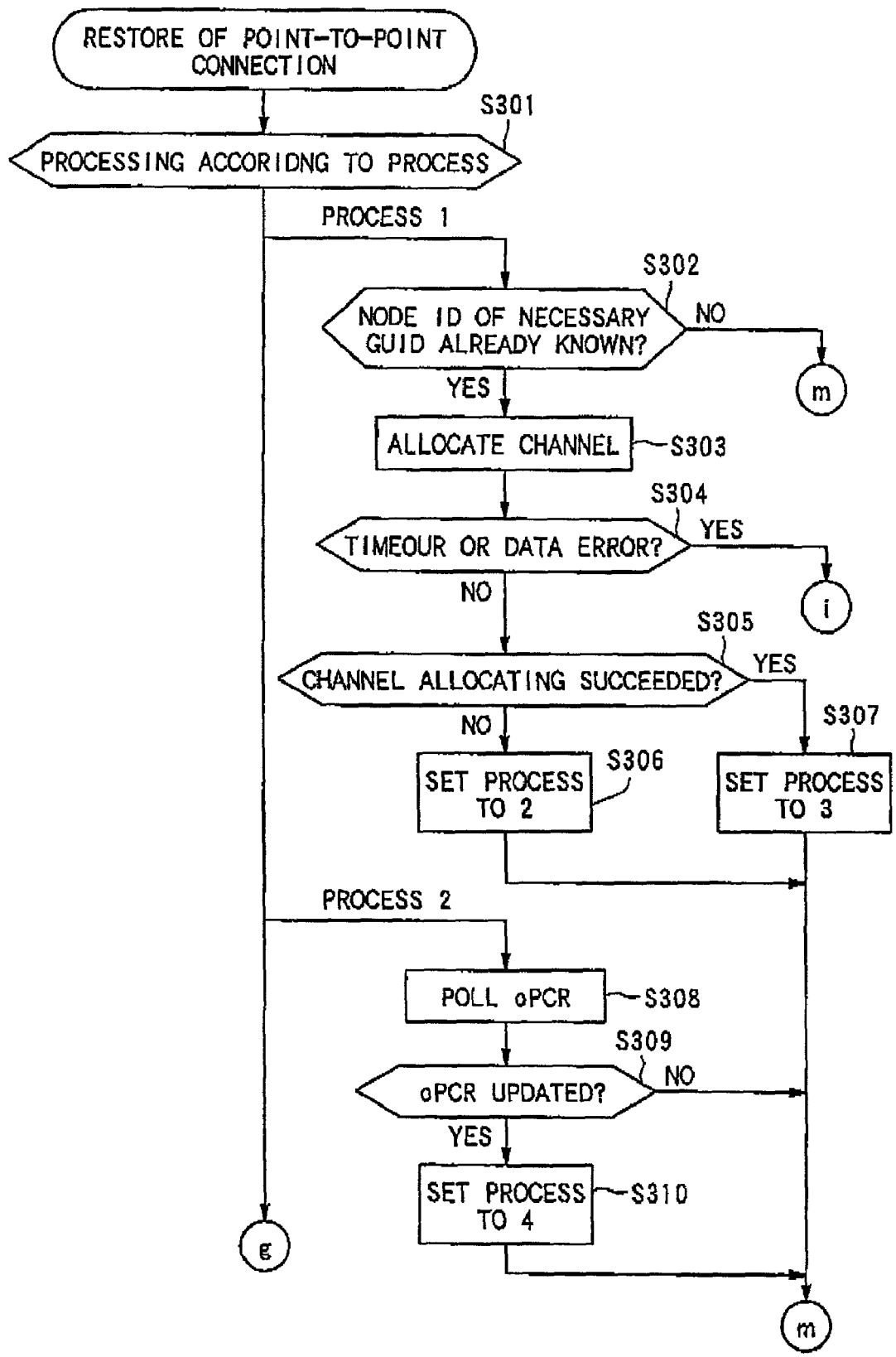
FIG. 12 is a first flowchart showing a restoration process of a Point-to-point connection.

Next, description will be made of restoration of a Point-to-point connection of step S12 by referring to flowcharts of FIGS. 12 to 15. As shown in FIG. 12, when restoration of a Point-to-point connection is started based on the restoration connection queue, access is made to Point-to-point connection information of the connection information database, and individual processing discriminated by each of the above-described processes is executed (step S301). For the restoration of a Point-to-point connection, the process 1 is divided into totally eight individual processing operations, and thus there are more operations than in the restoration of the Broadcast-out connection. Also, in this case, it is assumed that an initial value of the process is set to 1.

As shown in FIG. 12, when the process 1 is executed based on determination of step S301, determination is made as to whether a GUID necessary for a Point-to-point connection has already been known or not (step S302), That is, since both an input plug and an output plug are present in the Point-to-point connection, it is verified that a QUID has already been acquired in step S9 of FIG. 6, on the assumption that an AV device of each node can be determined. Alternatively, by specifying a transmission node from an isochronous packet received after bus resetting, an AV device connected before the bus resetting may be determined. As a result, if GUID is unknown (step S302; NO), the process proceeds to step S333 (FIG. 15) without executing any processing thereafter.

On the other hand, if a GUID is known (step S302; YES), a channel is allocated, which is used for a Point-to-point connection to be restored (step S303). That is, access is made to a CHANNELS_AVAILABLE register of a CSR space, and a channel is allocated by performing updating corresponding to the above-described channel. Then, determination is made as to an occurrence of a timeout (passage of time of 800 cycles (=100 msec.)) or a data error in the processing of step S303 (step S304). If a result of the determination in step S304 shows "YES", since a channel cannot be allocated, the process proceeds to step S330 (FIG. 15) without executing any processing thereafter.

Figure 15:
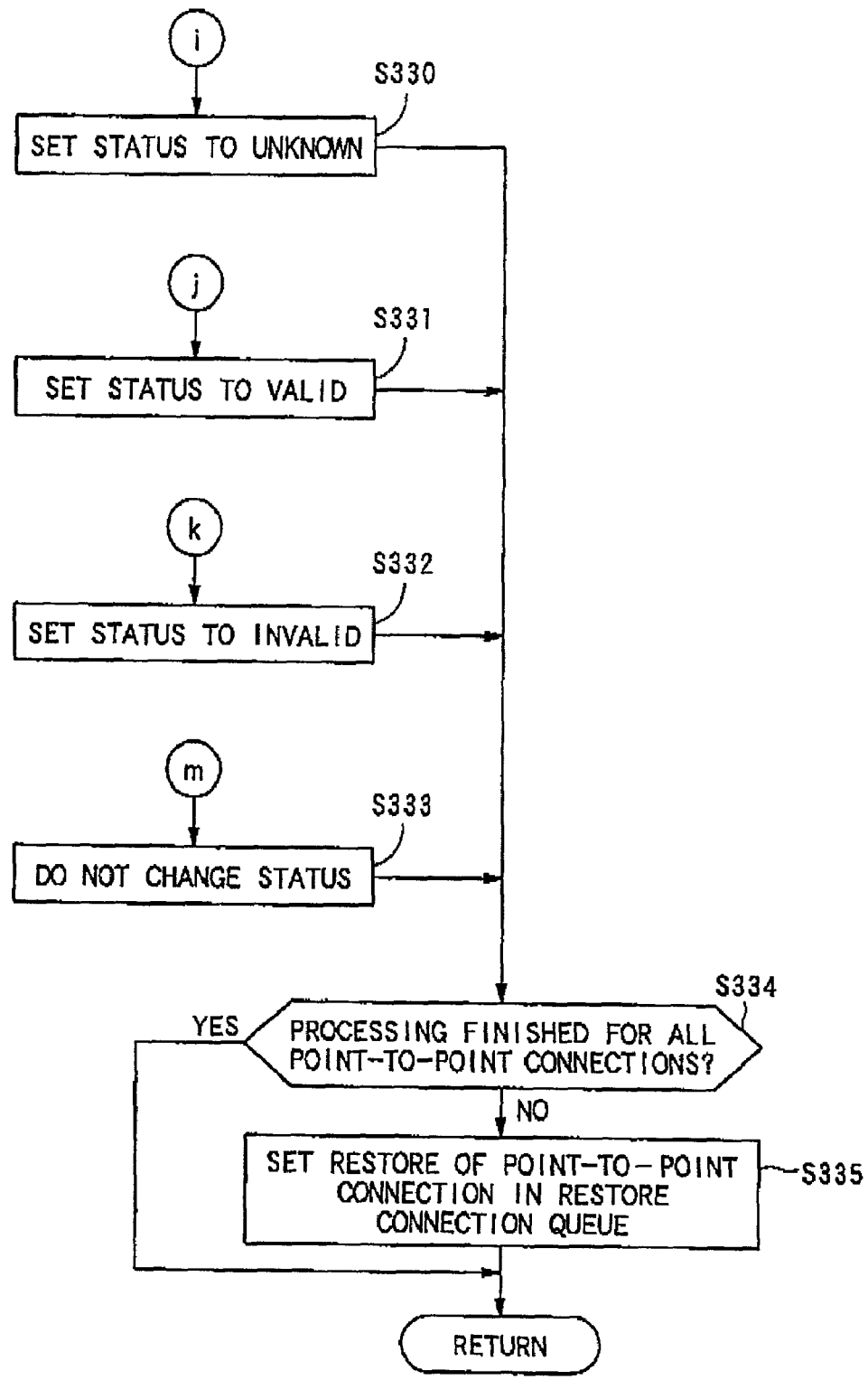
FIG. 15 is a fourth flowchart showing the restoration process of the Point-to-point connection.

If a result of the determination in step S304 shows "NO", determination is made as to success of allocating a desired channel (step S305). As a result, if the allocating of a channel fails (step S305; NO), the process is set to 2 step S306). If the allocating of a channel succeeds (step S305; YES), the process is set to 3 (step S307). After end of step S307, the process proceeds to step S333 (FIG. 15).

Subsequently, when the process 2 is executed based on determination of step S301, polling of the oPCR is carried out for an output plug to be connected (step S308). As in the case of the restoration of the Broadcast-out connection, this processing is based on consideration given to overlaying of a Broadcast connection and a Point-to-point connection on each other. That is, in step S308, assuming that overlaying is carried out by another node, oPCR polling is executed in order to monitor up Rating of the Point-to-point connection counter of the oPCR of each output plug after bus resetting.

Then, determination is made as to whether the oPCR polled in step S308 has be updated or not (step S309). If a result of the determination in step S309 shows "NO", the process proceeds to step S333 (FIG. 15). On the other hand, if a result of the determination in step S309 shows YES, the process is set to 4 (step S310), and the process proceeds to step S333 (FIG. 15).

Figure 13:
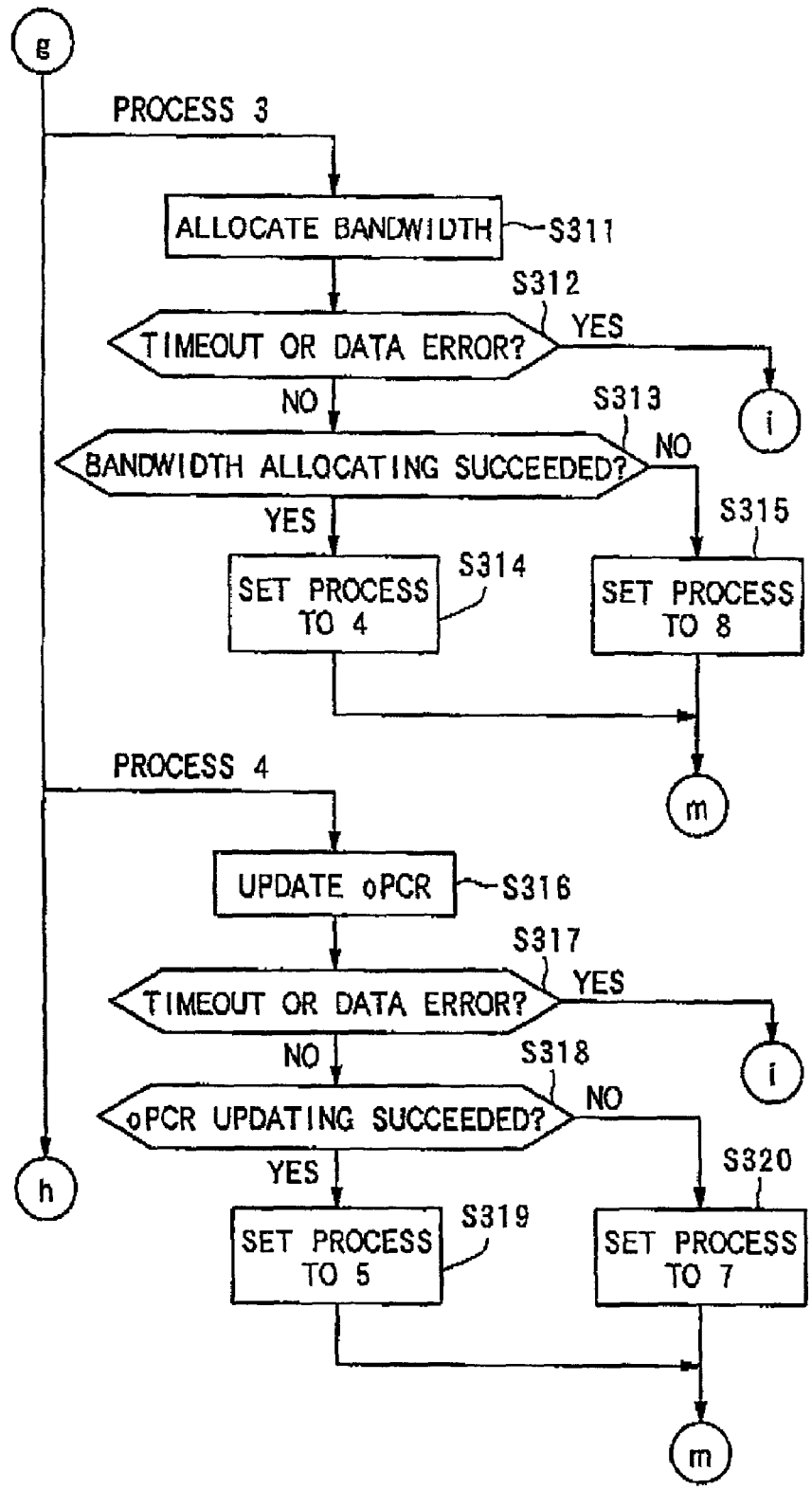
FIG. 13 is a second flowchart showing the restoration process of the Point-to-point connection.

Subsequently, as shown in FIG. 13, when the process 3 is executed based on determination of step S301, a bandwidth necessary for transmission/reception is allocated (step S311). That is, access is made to a BANDWIDTH_A AVAILABLE register of a CSR space, and a bandwidth is allocated by performing updating corresponding to the bandwidth necessary for transmission/reception. Then, determination is made as to an occurrence of a timeout (passage of time of 800 cycles (=100 msec.)) or a data error in the processing of step S311 (step S312). If a result of the determination in step S312 shows "YES", the process proceeds to step S330 (FIG. 15) without executing any processing thereafter.

On the other hand, if a result of the determination in step S312 shows "NO", determination is made as to success of allocating the necessary bandwidth (step S313). If the bandwidth allocating succeeds (step S313; YES"), the process is set to 4 (step S314). If the bandwidth allocating fails (step S313; NO), the process is set to 8 (step S315). After end of step S314 or S315, the process proceeds to step S333 (FIG. 15).

Subsequently, when the process 4 is executed based on determination of step S301, the oPCR is updated for an output plug of the transmission side of the Point-to-point connection (step S316). Here, processing is carried out on the assumption that a node of a Point-to-point connection establishment side is different from a node to be updated. In this case, by issuing a transaction to the node to be updated, values corresponding to the channel and the bandwidth allocated in the processes 1 and 3 are set for a channel number and a data transmission/reception speed of the oPCR, and the Point-to-point connection counter is incremented. Then, determination is made as to an occurrence of a timeout (passage of time of 800 cycles (=100 msec.)) or a data error in the processing of step S316 (step S317). If a result of the determination shows DES, the process proceeds to step S331 (FIG. 15) without executing any processing thereafter.

On the other hand, if a result of the determination shows "NO", determination is made as to success of updating the oPCR (step S318). As a result, if the oPCR updating succeeds (step S318; YES), the process is set to 5 (step S319). If the oPCR updating fails (step S318; NO), the process is set to 7 (step S320). After end of step S319 or S320, the process proceeds to step S333 (FIG. 15).

Figure 14:
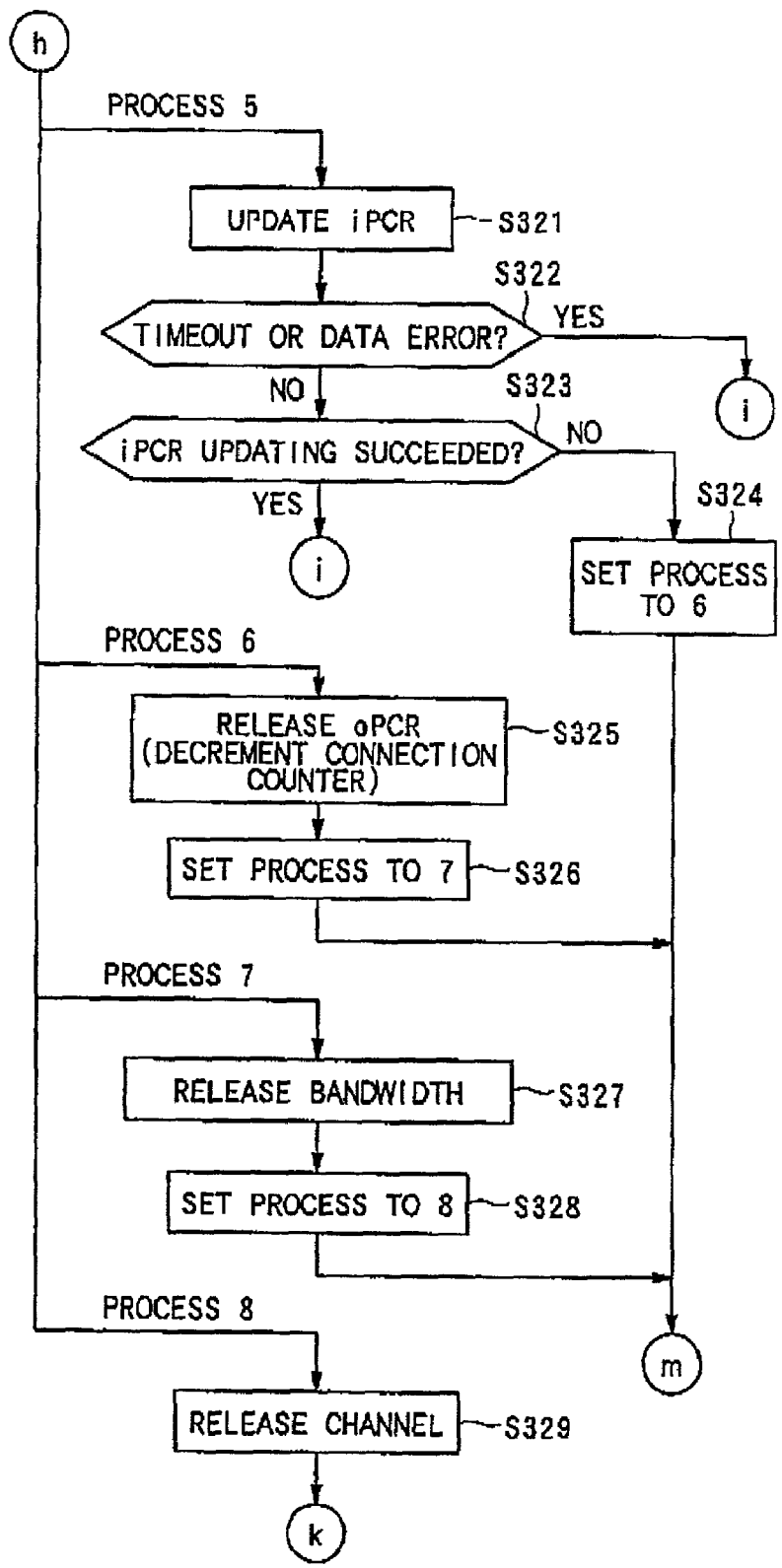
FIG. 14 is a third flowchart showing the restoration process of the Point-to-point connection.

Subsequently, as shown in FIG. 14, when the process 5 is executed based on determination of step S301, the iPCR is updated for an input plug of the receiving side of the Point-to-point connection (step S321). Similarly to the above case, the processing is carried put on the assumption that an ode of a Point-to-point connection establishment side is different from a node to be updated. In this case, by issuing a transaction to the node to be updated, the channel allocated in the process 1 is set to a channel number of the iPCR, and the Point-to-point counter is incremented. Then, determination is made as to an occurrence of a timeout passage of time of 800 cycles (=100 msec.)) or a data error in the processing of step S321 (step S322). If a result of the determination shows the process proceeds to step S330 (FIG. 15) without executing any processing thereafter.

On the other hand, if a result of the determination in step S322 shows "NO", determination is made as to success of updating the iPCR (step S323). As a result, if the iPCR updating succeeds (step S323; YES), the process proceeds to step S331 (FIG. 15). If the iPCR updating fails (step S323; NO), the process is set to 6 (step S324). After end of step S324, the process proceed to step S333 (FIG. 15).

Subsequently, when the process 6 is executed based on determination of step S301, the oPCR updated in the process 4 is reset (that is, the Point-to-point counter is decremented) (step S325). This processing is carried out when the iPCR cannot be updated for the input plug of the receiving side in the process 5 even if the oPCR is updated for the output plug of the transmission side in the process 4. That is, since an impossibility of restoration of a desired Point-to-point connection is determined at this point of time, step S325 is executed in order to return the oPCR to its original status. Then, the process is set to 7 (step S326), and the process proceeds to step S333 (FIG. 15).

Subsequently, when the process 7 is executed based on determination of step S301, the bandwidth allocated in step S311 is reset (step S327). This processing is carried out when the oPCR cannot be updated for the output plug of the transmission side in the process 4, or the iPCR cannot be updated for the input plug of the receiving side in the process 5. In either case, an impossibility of restoration of a desired Point-to-point connection is determined at this point of time, and step S327 is executed to reset the allocated bandwidth. Then, the process is set to 8 (step S328), and the process proceeds to step S333 (FIG. 15).

When the process 8 is executed based on determination of step S301, the channel a located in step S303 is reset (step S329). That is, for a reason similar to that for the foregoing process 7, step S329 is executed to reset the allocated channel. Then, the process proceeds to step S332 (FIG. 15).

Next, description will be made of processing sequent to each of the processes 1 to 3 in the restoration of a Broadcast-in connection by referring to a flowchart of FIG. 15. Steps S330 to S333 are operations carried out for a target status of a connection information database.

First, if processing is a sequel to the determination of a timeout or a data error in each of the processes 1, 3, 4 and 5, a status is set to UNKNOWN (step S330). As described above, a possibility of normal restoration of a connection to be process is unknown at this point of time.

If processing is a sequel to step S323 (FIG. 14) of the process 5, a status is set to VALID (step S331). In this case, the allocating of a channel and a ban width, and the updating of the oPCR and the iPCR succeeded, and a connection to be processed has been restored, and is in a valid status at this point of time.

If processing is a sequel to step S329 (FIG. 14) of the process 8, a status is set to VALID (step S332). In this case, since the channel and the bandwidth were reset for the above-described reasons, a connection to be processed cannot be restored, and is in an invalid status at this point of time.

If processing is a sequel to setting of processing to be executed next in each of the processes 1 to 8, or a sequel to step S309 (FIG. 12) of the process 2, an original value is maintained without changing a status (step S333). In this case, the connection restoration must be continued, and a status only needs to be changed when processing further progresses.

After step S330 to S333, determination is made as to end of restoration for all Point-to-point connections of a target node (step S334). If a result of the determination shows that there is an unfinished Point-to-point connection (step S334; NO), restoration of the Point-to-point connection is registered in the restoration connection queue (step S335). Thus, for restoration of a remaining Point-to-point connection, the operations of FIGS. 12 to 15 are executed again based on the order of restoration connection queue later. On the other hand, if a result of the determination show that the foregoing processing has been finished for all the Point-to-point connections (step S334; YES), or after end of step S335, the processing of FIG. 15 is terminated, and the process proceeds to step S13 (FIG. 6).

As processing to be subjected to control for an execution order in step S8 of FIG. 6, the acquisition of a GUID, the restoration of a Broadcast-out connection, the restoration of the Broadcast-in connection, and the restoration of the Point-to-point connection were respectively described. Turning back to FIG. 6, following steps S9 to S12, presence of new bus resetting is detected (step S13). As a result, if an occurrence of bus resetting is detected (step S13; YES), the process returns to step S2, where initialization is executed again (steps S3 and S4), and the foregoing processing is performed from the start. On the other hand, if no occurrence of bus resetting is detected (step S13; NO), the processing of step S4 and after is repeated.

Therefore, according to the embodiment, the processing regarding connection restoration at each node is largely divided into four portions, and the execution order thereof is controlled by the restoration connection queue. For the restoration of a Broadcast-out connection and the restoration of a Point-to-point connection, control is performed such that each is subdivided, and a plurality of processes are executed in a divided manner. In this case, a managing status of the isochronous resources allocated in the process is set by a status each time and, lastly, if there are many unknown statuses for the entire bus, the bus is reset to execute connection restoration again. Thus, it is possible to effectively set the bus resources by preventing the isochronous resources from being left unused.

The embodiment has been described based on the case of applying the present invention to the connection restoration at the time of bus resetting. However, other than at the time of bus resetting, the present invention can be widely applied to general connection establishment.

Furthermore, the embodiment has been described based on the case of applying the present invention to the data transmission/reception system, which employs the IEEE 1394 Standard as an interface standard for data transmission/reception. However, there should be no limitation in this regard, and the present invention can be widely applied to various data transmission/reception systems, which need connection establishments.

As apparent from the foregoing, the present invention is advantageous in that a highly reliable data transmission/reception system, an information transmission/reception apparatus, and a connection establishing method can be provided by making determination as to a manageable status of bus resources by using connection status information at each node when a connection is established in the data transmission/reception system, preventing unmanageable bus resources from being left after the connection establishment, and properly allocating bus resources.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosures of Japanese Patent Application No. 2001-5648 filed on Jan. 12, 2001 including the specification, claims, diagrams and summary is incorporated herein by reference in its entirety.

What is claimed is:

1. A data transmission system comprising:
a plurality of information transmitters connected to nodes on a bus, for transferring data through a connection established between the nodes;
a connection establishing device for establishing a connection at each node;
a connection status information holding device for holding connection status information indicating a managing status of isochronous resources as bus resources while updating it during the execution of the connection establishment at each node, the managing status of the isochronous resources including an unknown status, a valid status, an invalid status, and a status of processing being executed;
a connection status information referring device for referring to the connection status information; and
a processing executing device for executing predetermined processing to avoid unmanageable status of the isochronous resources when it is determined that the unknown status is out of a permissible range.

2. The data transmission system according to claim 1, wherein
a plurality of connection establishments are provided corresponding to types of the connections, and
the connection status information holding device holds the connection status information for each connection establishment.

3. The data transmission system according to claim 2, wherein
the bus is a serial bus compliant with IEEE 1394 Standard, and
the plurality of connection establishments include establishment of a Broadcast-out connection, establishment of a Broadcast-in connection, and establishment of a Point-to-point connection.

4. The data transmission system of claim 3, wherein the plurality of connection establishments includes restoration of the Broadcast-out connection, restoration of the Broadcast-in connection, and restoration of the Point-to-point connection in accordance with connection restoration carried out to restore the connection at each node before a passage of predetermined time after resetting of the connection established following the bus resetting.

5. The data transmission system according to claim 1, wherein
the processing executing device generates bus resetting if a predetermined number or more of bits of the connection status information set in unknown statuses are present among connections to be established on the bus.

6. The data transmission system according to claim 1, wherein
the connection establishments include processing for allocating a channel for interconnecting the nodes, and processing for allocating a band necessary for data transmission, and
the connection status information holding device updates the connection status information to an unknown status if a transaction in each processing results in a timeout or a data error.

7. A connection establishing method for establishing a connection between nodes of a data transmission system in which a plurality of information transmitters connected to the nodes on a bus transmit data, comprising the processes of:
holding connection status information indicating a managing status of isochronous resources as bus resources while updating it during the execution of the connection establishment at each node, the managing status of the isochronous resources including an unknown status, a valid status, an invalid status, and a status of processing being executed;
referring to the connection status information; and
executing predetermined processing to avoid unmanageable status of the isochronous resources when it is determined that the unknown status is out of a permissible range.

8. The connection establishing method according to claim 7, wherein
a plurality of connection establishments are provided corresponding to types of the connections, and
the connection status information holding process holds the connection status information for each connection establishment.

9. The connection establishing method according to claim 8, wherein
the bus is a serial bus compliant with IEEE 1394 Standard, and
the plurality of connection establishments include establishment of a Broadcast-out connection, establishment of a Broadcast-in connection, and establishment of a Point-to-point connection.

10. The connection establishing method according to claim 7, wherein
the predetermined processing executing process generates bus resetting if a predetermined number or more of bits of the connection status information set in unknown statuses are present among connections to be established on the bus.

11. The connection establishing method according to claim 7, wherein
the connection establishments include processing for allocating a channel for interconnecting the nodes, and processing for allocating a band necessary for data transmission, and
the connection status information holding process updates the connection status information to an unknown status if a transaction in each processing results in a timeout or a data error.

12. An information transmission apparatus connected to a node on a bus, for transmitting and receiving data through a connection established with another node, comprising:

a connection establishing device for establishing the connection with another node;

a connection status information holding device for holding connection status information indicating a managing status of isochronous resources as bus resources while updating it during the execution of the connection establishment, the managing status of the isochronous resources including an unknown status, a valid status, an invalid status, and a status of processing being executed;

a connection status information referring device for referring to the connection status information; and a processing executing device for executing predetermined processing to avoid unmanageable status of the bus resources when it is determined that the unknown status is out of a permissible range.

13. The information transmission apparatus according to claim 12, wherein a plurality of connection establishments are provided corresponding to types of the connections, and the connection status information holding device holds the connection status information for each connection establishment.

14. The information transmission apparatus according to claim 13, wherein the bus is a serial bus compliant with IEEE 1394 Standard, and the plurality of connection establishments include establishment of a Broadcast-out connection, establishment of a Broadcast-in connection, and establishment of a Point-to-point connection.

15. The information transmission apparatus according to claim 12, wherein the processing executing device generates bus resetting if a predetermined number or more of bits of the connection status information set in unknown statuses are present among connections to be established on the bus.

16. The information transmission apparatus according to claim 13, wherein the plurality of connection establishments includes restoration of the Broadcast-out connection, restoration of the Broadcast-in connection, and restoration of the Point-to-point connection in accordance with connection restoration carried out to restore the connection at each node before a passage of predetermined time after resetting of the connection established following the bus resetting.

17. The information transmission apparatus according to claim 12, wherein the connection establishments include processing for allocating a channel for interconnecting the nodes, and processing for allocating a band necessary for data transmission, and the connection status information holding device updates the connection status information to an unknown status if a timeout or a data error occurs in each processing.

* * * * *